United States Patent Office 2,917,199
Patented Dec. 15, 1959

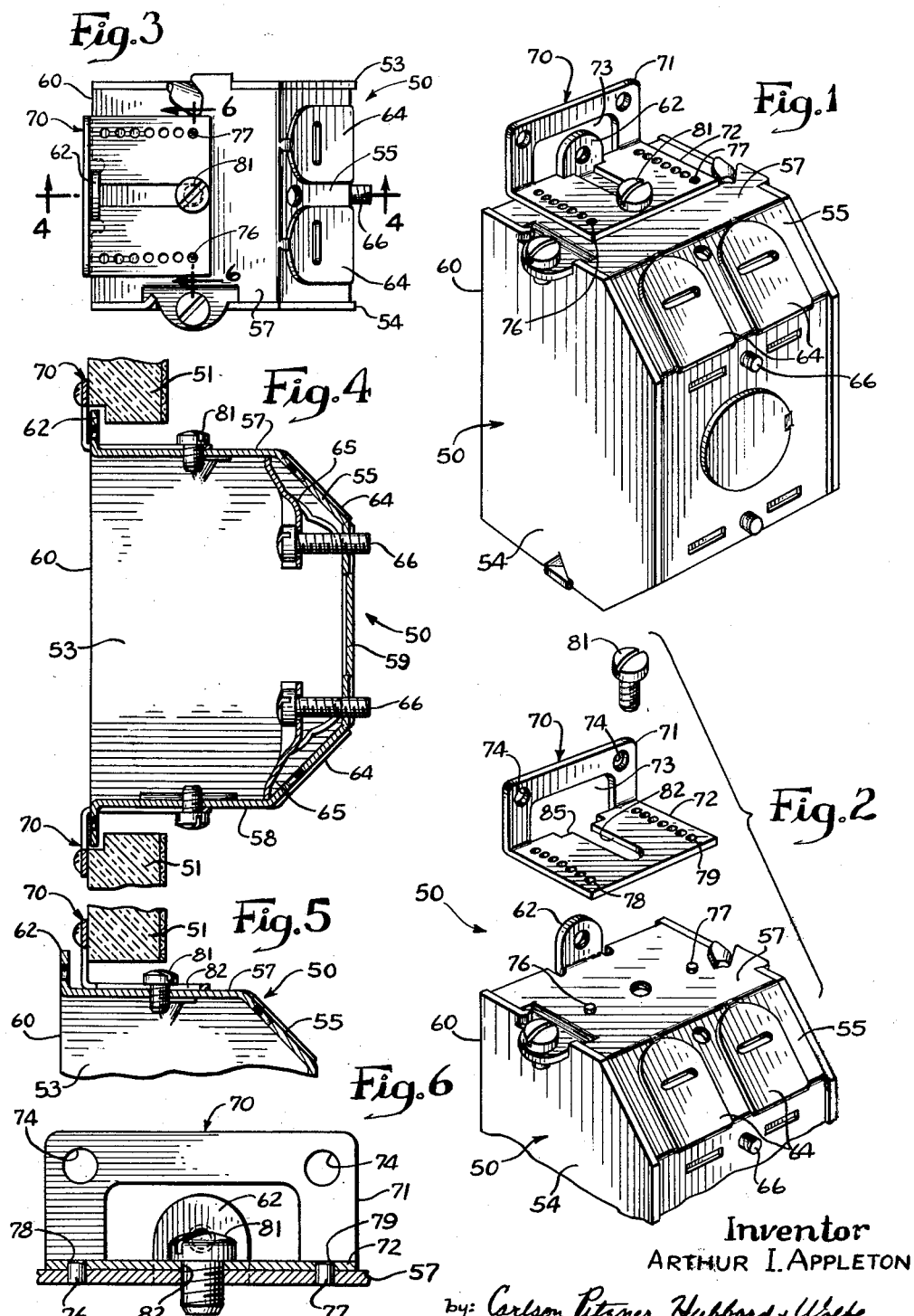

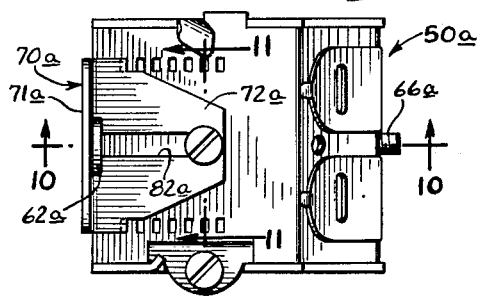
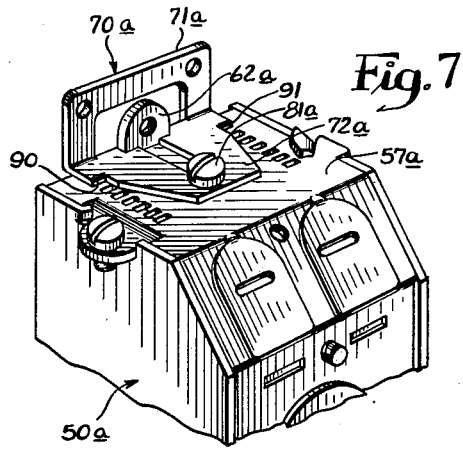
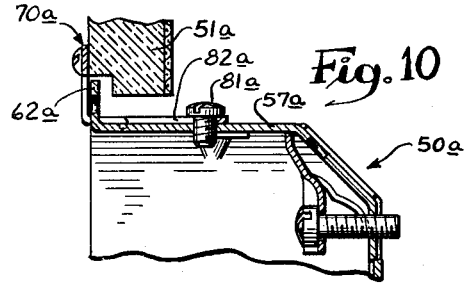
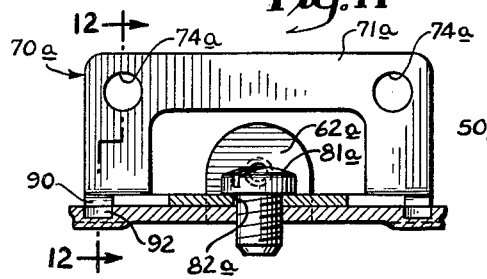
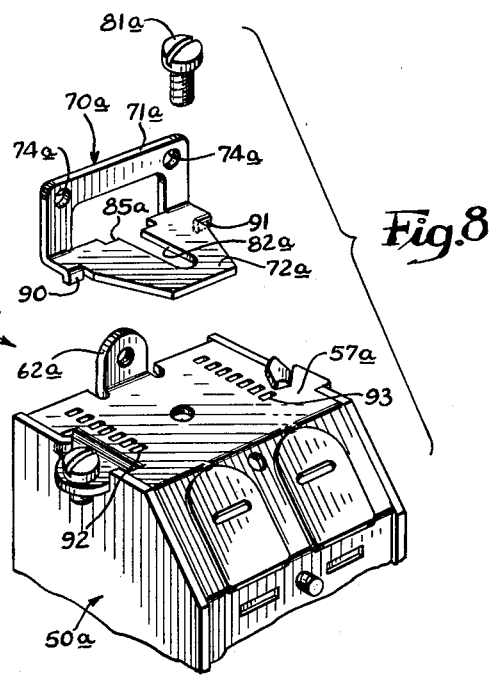
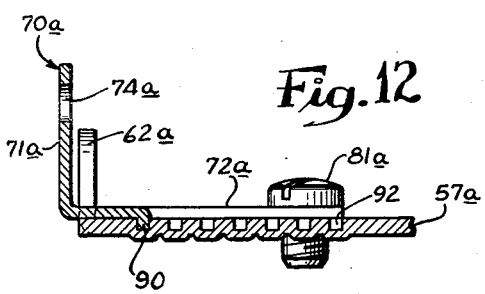

2,917,199

MOUNTING FOR SWITCHBOX AND THE LIKE

Arthur I. Appleton, Northbrook, Ill.

Application September 26, 1956, Serial No. 612,145

3 Claims. (Cl. 220—3.7)

The present invention relates to switchboxes for use in electrical wiring systems. More particularly, the present invention relates to an improved adjustable mounting device for use when installing a switch or outlet box in a wall recess.

When a switch box is to be mounted in a wall recess, it is desirable that the switchbox be mounted so as to make allowance for the addition of a finish surface to the wall, such as a layer of plaster or plaster board, after the box is secured in place. This can be effectively accomplished by allowing the box to extend outwardly from the unfinished wall surface an amount equal to the thickness of the proposed finish layer.

One object of the present invention is to provide a novel switchbox having an improved adjustable plaster ear or mounting device which is easily secured to the box and which is adjustable to accommodate the box to a wide range of thicknesses of wall surface coatings or layers.

Another object of the present invention is to adjustably attach a plaster ear or similar mounting device to a switchbox in an improved manner affording an inherently strong and durable mounting for the switchbox, which mounting affords a positive support for the box and finds particular but not exclusive use on boxes which are subject to abuse and other stresses during installation.

A further object of the present invention is to provide an improved plaster ear which is simply and economically manufactured and which is susceptible of rapid and accurate installation on a switchbox to afford an improved mounting for the box.

Other objects and advantages will become apparent as the following description proceeds, taken in connection with the accompanying drawings in which:

Figure 1 is an isometric drawing of a switchbox and plaster ear illustrative of the present invention.

Fig. 2 is an isometric drawing of the box and plaster ear shown in Fig. 1 with the parts in exploded relation.

Fig. 3 is a plan view of the box and plaster ear shown in Fig. 1.

Fig. 4 is a view taken substantially in the plane of line 4—4 of Fig. 3 and showing a plaster ear attached to the box and in a position for the flush mounting of the box in a wall recess.

Fig. 5 is a fragmentary view similar to that of Fig. 4 but showing the plaster ear in a position for the extended mounting of the box in a wall recess making allowance for the addition of a finish layer on the wall.

Fig. 6 is a fragmentary elevation view taken substantially in the plane of line 6—6 of Fig. 3.

Fig. 7 is an isometric drawing of a modified form of the present invention.

Fig. 8 is an isometric drawing of the modified form shown in Fig. 7 and with the parts in exploded relation.

Fig. 9 is a plan view of the modified form shown in Fig. 7.

Fig. 10 is an elevation view taken substantially in the plane of line 10—10 of Fig. 9 and showing the plaster ear in position for the flush mounting of the box.

Fig. 11 is an enlarged fragmentary view taken substantially in the plane of line 11—11 of Fig. 9.

Fig. 12 is a fragmentary elevation view taken substantially in the plane of line 12—12 of Fig. 11 and showing the ear and box engaging means.

While the invention is susceptible of various modifications and alternative constructions, certain preferred embodiments have been shown in the drawings and will be described below in detail. It should be understood, however, that there is no intention to limit the invention to the specific forms disclosed but, on the contrary, the intention is to cover all modifications, alternative constructions and equivalents falling within the spirit and scope of the invention as expressed in the appended claims.

Referring more specifically to the drawings, there is shown an illustrative outlet box or switchbox 50 which, in this instance, happens to be mounted in a recess in a wall 51. The box 50, which may be conveniently formed of heavy gauge sheet metal stampings, comprises a pair of side panels 53, 54 fixed to and separated by a spacer panel 55. In this case, the spacer panel is of generally U-shaped form and describes a pair of opposed facing end panels 57, 58 contiguous with a back panel 59. The U-shaped spacer panel 55, together with the side panels 53, 54, defines a box structure having an open side terminating in a free edge 60. The end panels 57, 58 are each formed with a mounting ear 62 lying adjacent the free edge 60 and adapted to serve as anchorage points for a convenience outlet or switch housed within the box.

To accommodate electrical cable or the like, the spacer panel 55 is formed with a series of knock-out plugs 64 which, when removed, permit the introduction of one or more electrical conduits (not shown) carrying power supply wiring into the box 50. When flexible conduit is used for this purpose, it may be anchored within the box by means of inside clamp jaws 65 and their associated clamping screws 66.

In order to secure the box 50 to the plaster wall 51, or any other appropriate support, a mounting device, referred to here as a plaster ear 70, is provided on each end panel 57, 58 of the box. Each of the illustrative plaster ears 70 comprises a single piece of sheet metal stock which is cut and bent to form substantially perpendicular legs 71, 72. Both of these legs are interrupted by a central aperture 73, the purpose of which is to provide clearance for the switch mounting ears 62 on the panels 57, 58 of the box. When the plaster ear 70 is mounted on the box 50, one leg 71 extends outwardly from the box and is provided with holes 74 to receive nails or other appropriate fasteners for mounting the box on the wall, while the other leg 72, being plate-like in form, is held flush against one end panel of the box.

Different positions which the ear can take on the box are shown in Figs. 4 and 5. In Fig. 4 the plaster ear 70 is shown in the position in which it is placed when the box is to be mounted in a recess in a plaster wall and with its free edge 60 in the plane of the existing wall. This is known as "flush mounting." In Fig. 5, on the other hand, the plaster ear 70 has been displaced from the forward edge 60 of the box to afford a mounting in which the forward free edge 60 of box 50 extends outwardly from the plaster wall. When this latter mounting position is employed, a finish coat of plaster or other sheet material can be applied and the outer edge 60 of the box will be flush with the finished wall.

In accordance with the present invention, provision is made for fixing the position of the plaster ears 70 on the box 50 and in a selective manner in order to accommodate the box for use with a wide variety of wall thicknesses and surface finish layers. One means for accomplishing this is shown in Figs. 1 through 6 and comprises a pair of spaced, alined projections 76, 77 transversely disposed on each of the end wall panels 57, 58. These projections are adapted to engage in a pair of similarly spaced apertures 78, 79 on the remaining leg 72 of the plaster ear 70 when the ear is placed against the box wall. Adjustability of the ear on the box is afforded by a plurality of pairs of spaced apertures 78, 79 formed on the ear in the manner of a pair of spaced columns as shown in Fig. 2. The plaster ear can thus be selectively engaged with the end panel of the box 50 by engaging the projections on the box with a selected pair of apertures on the plaster ear. Because the ear is fixed with respect to the box at least two points when the spaced projections 76, 77 are engaged in selected apertures, the ear is rigidly and non-rotatably mounted against the box.

Means are provided for clamping the plaster ear against the end panel of the box 50, when the ear is placed in its desired position. For example, one such means comprises a clamping screw 81 the shank of which passes through a slot 82 in the plaster ear and is threadably engaged with the end wall of the box (Fig. 4). It should be understood, however, that equivalent means, such as a bifurcated spring lug on the plaster ear releasably engageable in a selected slot in the box panel, as shown in my application Serial No. 565,017, filed February 13, 1956, can be used to advantage. The slot 82 in the plaster ear extends parallel to the columns of apertures 78, 79, and provides a sliding adjustment of the plaster ear on the end panel 57 so as to permit the engagement of a selected pair of apertures 78, 79 in the plaster ear with the pair of projections 76, 77 on the box.

In order to increase the mounting strength when the plaster ear is held against the box with its outwardly extending leg 71 in the plane of the box opening and in the position affording flush mounting of the box on an existing wall (Fig. 4), the plaster ear 70 is formed with internal shoulders 85 defining a portion of the central aperture 73 and adapted to engage the switch mounting ear 62 on each end panel 57, 58 of the box. In the particular position shown in Fig. 4, which is generally the most common position in which the plaster ear is used, the shoulders 85 abut the ear 62 on the box and give additional support to the plaster ear when it is mounted on the switchbox.

The pair of spaced projections 76, 77 is desirably formed by embossing the surface of the end panels 57, 58, although pins or the like may be welded to the end panels of the switch box to serve the purpose.

Attachment of the plaster ears 60 to the panels 57, 58 of the box 50 is easily and quickly effected by the use of a screwdriver. To this end, the clamping screw 81 is first loosened and the plaster ear is disengaged from the projections 76, 77 and slid parallel to the surface of the end panel 57, 58 until its desired position with respect to the forward free edge 60 of the box is obtained. The projections 76, 77 are then engaged in the nearest apertures 78, 79 in the ear and the clamping screw 81 is tightened. The engagement of the projections or keys 76, 77 in pair of apertures 78, 79 in the plaster ear affords a secure, positive non-slip mounting of the plaster ear on the box.

A modified form of the present invention is shown in Figs. 7 through 12. In describing this modification the reference characters used above will be employed where applicable with the distinguishing suffix "a." In this modification, provision is made, in accordance with the present invention, for adjustably attaching a plaster ear 70a, comprising a pair of substantially perpendicular legs 71a, 72a interrupted by a central aperture 73a, to the end panels 57a, 58a of a switchbox 50a of the type described above. This is accomplished by means of a pair of spaced depending keys or tangs 90, 91 on the one leg 72a of the plaster ear 70a adapted to be selectively secured in plate-like fashion against an end panel 57a of the box 50a. When the modified plaster ear 70a is positioned on the end panel of the box, the spaced tangs 90, 91 engage in correspondingly spaced apertures 92, 93 in the wall 57a of the box. A series of such spaced apertures 92, 93, forming a pair of longitudinally extending spaced columns of apertures on the box wall 57a, affords a range of adjustment of the plaster ear on the box (Fig. 8). As described above, a clamping screw 81a passes through a longitudinally extending slot 82a in the plaster ear 70a and is threadably engaged with the end panel 57a of the switch box.

In order to strengthen the engagement of the plaster ear 70a with the box when the plaster ear is held on the box with its outwardly extending leg 71a in the plane of the box opening, the plaster ear is formed with a shoulder 85a adapted to engage a switch mounting ear 62a on the box in the manner described above.

The longitudinally extending slot 82a affords selective adjustment of the plaster ear 70a on the end panel of the box, which adjustment is easily accomplished by merely loosening the clamping screw 81a and positioning the depending tangs 90, 91 in a selected pair of apertures 92, 93 and subsequently tightening the clamping screw (Fig. 12).

When the plaster ear 70a has been secured on the end panel 57a of the outlet box 50a, the box is then readily mounted on a wall 51a by inserting nails or other fasteners through suitable holes 74a in the extending flange or leg 71a (Fig. 11) of the plaster ear 70a.

If an unusually thick layer of finish material is to be applied to the wall 51 or 51a, it is one of the features of the invention that the plaster ear 70 or 70a, in either of the above described forms, can be turned end for end before attachment to the box. When the plaster ear is located in this reversed position, the outwardly extending legs, 71 or 71a, are disposed almost the full length of the switch box behind the plane of the front edge 60. In addition, the plaster ear, when so reversed, can be secured on the box in any intermediate position in the same manner as described above by merely loosening the clamping screw and selectively positioning the plaster ear on the box.

In light of the above disclosure, it is clear that the novel switch mounting device described provides an improved switchbox mounting which is easily adjustable over a wide range of positions by a simple manual operation. As an added advantage of the novel plaster ear and box, it can be seen that the rigid engagement between the two does not depend on how strongly the clamping screw is tightened. On the contrary, the two spaced projections 76, 77 or tangs 90, 91, when engaged in a selected pair of apertures 78, 79 or 92, 93 respectively, sustain substantially all of the forces which might be exerted on the plaster ear tending to rotate it or move it against the box and the sole purpose of the clamping screw is to keep the plaster ear against the box wall so as to assure that there is engagement between the projections or tangs and their corresponding selected apertures.

Accordingly, an improved switchbox has been described which can be used with a wide variety of finish wall thicknesses and which, when installed according to the present invention, affords a front opening flush with the finished wall. The improved plaster ear mounting arrangement affords a two-point rigid engagement of the ear with the box and thereby holds the ear securely against movement on the box when the ear has been positioned in its selected location. The plaster ear is adjustable before the box is mounted and, after the box has been fastened in place on the wall, the plaster ear effectively prevents the disarrangement and mislocation of the box during subsequent installation of conduit and wiring and during the application of the finish wall surface.

I claim as my invention:

1. For use with a switchbox having a pair of spaced projections on the exterior of one panel, a mounting device fastenable to the panel for securing the box to a wall and comprising a pair of substantially perpendicular legs, one of said legs having means facilitating attachment to the wall and the other of said legs having a longitudinal slot in the center portion therein for receiving the shank of a headed clamping screw threaded in the box panel intermediate said projections and alternatively tightenable or releasable, said other leg additionally having a plurality of pairs of spaced apertures with individual apertures of each pair being spaced on opposite sides of said slot corresponding to the spacing of the pair of projections, a selected pair of said apertures being engageable with the pair of spaced projections for holding said bracket against movement relative to said box when the clamping screw is tightened, said device being adjustable along the box panel upon loosening said clamping screw and sliding said other leg guided by said screw in said slot to a selected position of engagement of the projections with others of the apertures for accommodating a wide variety of finish wall thicknesses between said wall attachment leg and the plane of the front of the box.

2. For securing to a wall a switchbox or the like having a pair of spaced projections on one end panel thereof, an open front side, and a switch mounting ear on said panel extending outwardly from the box in the plane of the open front side, a mounting device comprising a single piece of sheet metal having an attachment portion adapted for rigid connection with the wall, a plate-like portion lying parallel to and in contact with the exterior of the box panel having the projections thereon, means for attaching said plate-like portion to the box, said device further having a central aperture therein between said attachment and plate-like portions, and means defining a shoulder in such aperture, said plate-like portion having a plurality of pairs of spaced apertures selectively engageable with said pair of spaced projections to afford adjustment of the device along the box panel whereby a variety of finish wall thicknesses may be accommodated between said attachment portion and the plane of the box front, said shoulder being adapted to engage said box ear when said attachment portion is substantially in the plane of box front for strengthening the engagement between the box and the mounting device.

3. A switchbox comprising in combination, a pair of opposed side panels, a pair of opposed end panels, a back panel integral with said end panels and transversely extending between said side panels, said panels forming a box having a front opening defined by one marginal edge of the side and end panels, a pair of spaced projections transversely disposed on each of said end panels and spaced adjacent to but inwardly from said side panels, a clamping screw threaded in each of said end panels intermediate and alined with said projections and extending outwardly from said end panel, a switch mounting ear projecting outwardly from and at right angles to each end panel adjacent its opening defining edge, and a plaster ear adapted to be secured to the exterior of said end panels for mounting the box on a wall, said plaster ear having a box-engaging leg adapted to be releasably secured to an end panel of the box and an outturned flange adapted to be secured to the wall, said plaster ear having a pair of longitudinally extending columns of spaced apertures, the apertures of said columns being transversely spaced for selectively mating with said projections, said plaster ear also having a longitudinally extending slot intermediate said parallel columns and adapted to receive the shank of said clamping screw whereby said plaster ear is clamped against said end panel and said projections are held engaged in said apertures when said screw is tightened.

References Cited in the file of this patent
UNITED STATES PATENTS

| | | |
|---|---|---|
| 956,674 | Bonnell | May 3, 1910 |
| 1,435,711 | Kruse | Nov. 14, 1922 |
| 1,519,735 | Kruse | Dec. 16, 1924 |
| 1,552,911 | Calhoun | Sept. 8, 1925 |
| 1,734,543 | Thomas | Nov. 5, 1929 |
| 1,808,326 | Thomas | June 2, 1931 |
| 2,247,712 | Reese | July 1, 1941 |
| 2,769,562 | Rudolph | Nov. 6, 1956 |